United States Patent
Newton et al.

(10) Patent No.: US 12,510,530 B2
(45) Date of Patent: Dec. 30, 2025

(54) REAL TIME WATER CONTENT AND WATER-CEMENT MONITORING ON A READY-MIX CONCRETE TRUCK

(71) Applicant: CIDRA CORPORATE SERVICES LLC, Wallingford, CT (US)

(72) Inventors: David V. Newton, Madison, CT (US); Michael A. Davis, Glastonbury, CT (US)

(73) Assignee: CIDRA CORPORATE SERVICES LLC, Wallingford, CT (US)

( * ) Notice: Subject to any disclaimer, the term of this patent is extended or adjusted under 35 U.S.C. 154(b) by 0 days.

(21) Appl. No.: 18/018,956
(22) PCT Filed: Aug. 17, 2021
(86) PCT No.: PCT/US2021/046211
§ 371 (c)(1),
(2) Date: Jan. 31, 2023
(87) PCT Pub. No.: WO2022/040123
PCT Pub. Date: Feb. 24, 2022

(65) Prior Publication Data
US 2023/0288397 A1 Sep. 14, 2023

Related U.S. Application Data

(60) Provisional application No. 63/066,431, filed on Aug. 17, 2020.

(51) Int. Cl.
*G01N 33/38* (2006.01)
*B28C 5/42* (2006.01)
(Continued)

(52) U.S. Cl.
CPC ........... *G01N 33/383* (2013.01); *G01N 27/02* (2013.01); *B28C 5/422* (2013.01); *B28C 7/024* (2013.01);
(Continued)

(58) Field of Classification Search
CPC .. G01N 33/383; G01N 27/02; G01N 21/3554; G01N 21/359; B28C 5/422; B28C 7/024
(Continued)

(56) References Cited

U.S. PATENT DOCUMENTS

| 2,533,362 A | 12/1950 | Devine et al. |
| 2006/0191631 A1 | 8/2006 | Kojima et al. |

(Continued)

FOREIGN PATENT DOCUMENTS

| DE | 199 08 151 A1 | 11/2000 |
| DE | 20 2010 012841 U1 | 12/2010 |

(Continued)

OTHER PUBLICATIONS

She An-ming; Yao Wu; Yuan Wan-cheng; "Evolution of distribution and content of water in cement paste by low field nuclear magnetic resonance"; 2013; Published in Journal of Central South University, pp. 1109-1114 (Year: 2013).*

(Continued)

*Primary Examiner* — Peter J Macchiarolo
*Assistant Examiner* — John M Royston
(74) *Attorney, Agent, or Firm* — William J. Barber; WARE FRESSOLA MAGUIRE & BARBER LLP

(57) ABSTRACT

Apparatus for real time water content and water cement monitoring on a ready-mix concrete truck includes at least one real time moisture measurement module or sensor configured to
- sense continuous real time moisture measurements of a batch of wet cement loaded into a rotating drum of a ready-mix concrete truck; and
- provide signaling containing information about the continuous real time moisture measurements sensed.

The apparatus may include either a hatch door of the rotating drum of the ready-mix concrete truck, or the rotating drum of the ready-mix concrete truck, or the ready-mix concrete truck itself.

43 Claims, 3 Drawing Sheets

The mounting of the real time moisture measurement module or sensor (RTMMM/S) on an interior surface of a mixing drum wall.

(51) Int. Cl.
*B28C 7/02* (2006.01)
*G01N 21/3554* (2014.01)
*G01N 21/359* (2014.01)
*G01N 27/02* (2006.01)

(52) U.S. Cl.
CPC ....... *G01N 21/3554* (2013.01); *G01N 21/359* (2013.01)

(58) Field of Classification Search
USPC ........................................ 73/61.61
See application file for complete search history.

(56) References Cited

U.S. PATENT DOCUMENTS

| | | | | |
|---|---|---|---|---|
| 2012/0016523 A1* | 1/2012 | Koehler | ................. | G01N 11/00 700/265 |
| 2013/0192351 A1* | 8/2013 | Fernald | ................. | G01N 29/02 73/61.49 |
| 2015/0376489 A1 | 12/2015 | Li et al. | | |
| 2016/0009224 A1 | 1/2016 | Radjy | | |
| 2018/0238820 A1 | 8/2018 | Ghods et al. | | |
| 2018/0372624 A1 | 12/2018 | Fujiyama et al. | | |
| 2019/0017366 A1* | 1/2019 | Alaas | ................. | G06K 7/10366 |
| 2019/0217044 A1 | 7/2019 | Mcauley et al. | | |
| 2020/0173899 A1 | 6/2020 | Biesak et al. | | |

FOREIGN PATENT DOCUMENTS

| | | |
|---|---|---|
| DE | 10 2012 017445 B4 | 3/2015 |
| JP | 4958211 B2 | 6/2012 |
| WO | 1993/004485 A1 | 3/1993 |
| WO | 2019/210389 A1 | 11/2019 |

OTHER PUBLICATIONS

English language machine translation of JP4958211B2.
English language Abstract of JP4958211B2.
English language Abstract of DE202010012841U1.
English language Abstract DE102012017445B4.
English language Abstract DE19908151A1.

* cited by examiner

Apparatus 10 for real time water content and water cement monitoring on a ready-mix concrete truck,

At least one real time moisture measurement module or sensor (RTMMM/S) 20 having a signal processor or processing module 20a and being configured to sense continuous real time moisture measurements of a batch of wet cement loaded into a rotating drum of a ready-mix concrete truck; and provide signaling containing information about the continuous real time moisture measurements sensed.

Temperature sensor 22

Other signal processor circuits or components 20b that do not form part of the underlying invention, e.g., including input/output modules, one or more memory modules, data, address and control busing architecture, etc.

A real time moisture measurement control module 30 having a corresponding signal processor or processing module 30a and being configured to receive the signaling from the at least one real time moisture measurement module 20 and further process the signaling received.

Transceiver 32 configured to provide the signaling to a remote site for still further processing

Other signal processor circuits or components 30b that do not form part of the underlying invention, e.g., including input/output modules, one or more memory modules, data, address and control busing architecture, etc.

*FIG. 1:* The Apparatus 10

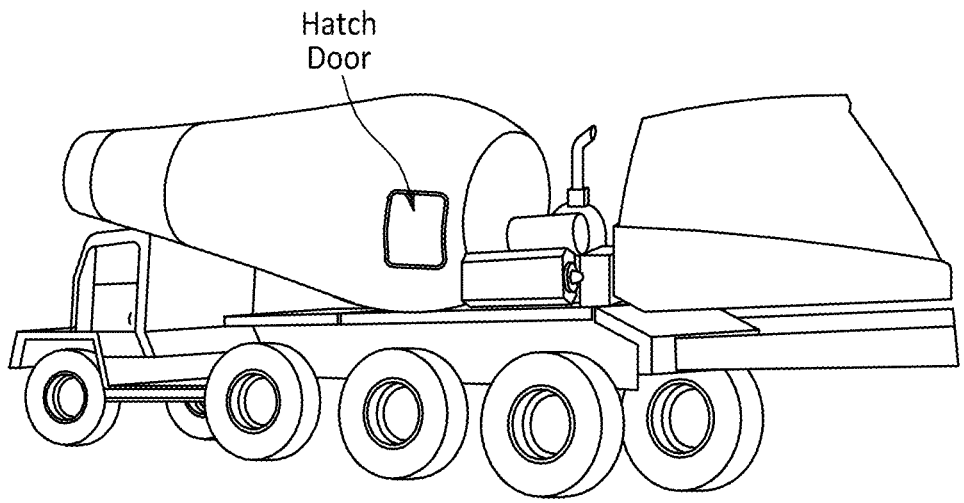
*FIG. 2:* Ready mix truck with an arrow pointing to a hatch door indicating a potential location of a real time moisture measurement module or sensor (RTMMM/S) installation.
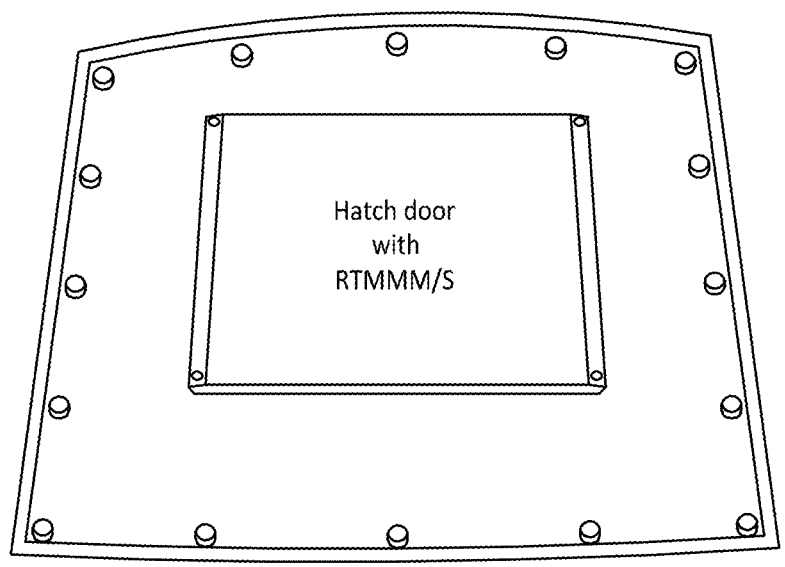
*FIG. 3:* Hatch door with a real time moisture measurement module or sensor (RTMMM/S) installed therein.

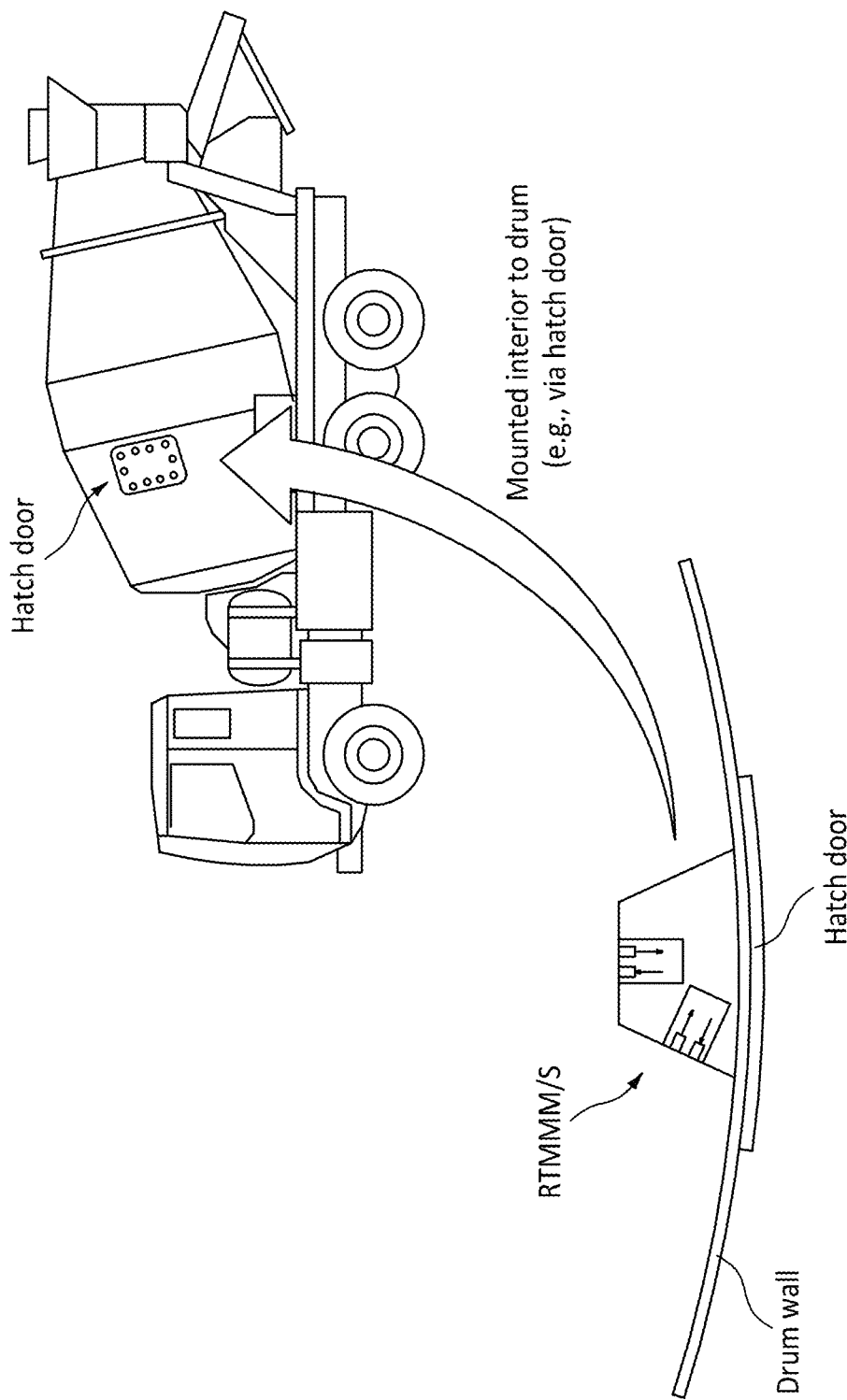
FIG. 4: The mounting of the real time moisture measurement module or sensor (RTMMM/S) on an interior surface of a mixing drum wall.

REAL TIME WATER CONTENT AND WATER-CEMENT MONITORING ON A READY-MIX CONCRETE TRUCK

CROSS-REFERENCE TO RELATED APPLICATIONS

This application is the U.S. National Stage of International Application Number PCT/US2021/046211 filed on 17 Aug. 2021, which application claims benefit to U.S. provisional patent application Ser. No. 63/066,431 (712-2.467// CCS-0216) filed on 17 Aug. 2020. Both applications are hereby incorporated by reference in their entirety.

This application is related to U.S. Pat. No. 10,156,547 (WFMB no. 712-002.365-1-1 (CCS-0075, 67, 104)), which corresponds to PCT/US2012/060822, filed 18 Oct. 2012, claiming benefit to provisional patent application Ser. No. 61/548,549 and Ser. No. 61/548,563, both filed 18 Oct. 2011, which are all incorporated by reference in their entirety.

This application is related to patent application Ser. No. 16/638,258 (WFMB no. 712-002.451-1-1 (CCS-0143)), which corresponds to PCT/US2018/047429, filed 22 Aug. 2018, claiming benefit to provisional patent application Ser. Nos. 62/548,638 and 62/548,699, both filed on 22 Aug. 2017, which are all incorporated by reference in their entirety.

This application is related to patent application Ser. No. 16/638,237 (WFMB no. 712-002.452-1-1 (CCS-0200)), which corresponds to PCT/US2018/047479, filed 22 Aug. 2018, claiming benefit to provisional patent application Ser. Nos. 62/548,699 and 62/548,712, both filed on 22 Aug. 2017; which are all incorporated by reference in their entirety.

The aforementioned applications were all assigned to the assignee of the present application, which builds on this family of technology.

BACKGROUND OF THE INVENTION

1. Field of Invention

This invention relates to a technique for real time water content and water cement monitoring on a ready-mix concrete truck.

2. Description of Related Art

U.S. Pat. No. 10,156,547 (WFMB no. 712-2.365-1-1 (CCS-0075, 67, 104)), assigned to the assignee of the present invention, discloses a technique for measuring entrained air in wet concrete loaded in a rotating drum of a ready-mix concrete truck, which is known in the industry as, AIRtrac™ sensor or AIRtrac Mobile™. The AIRtrac™ sensor may be permanently installed on the rotating container/concrete mixer drum or on the hatch door of a concrete mixer drum. The AIRtrac™ sensor includes an acoustic-based air probe that has an acoustic source that provides an acoustic signal into a mixture of concrete, and an acoustic receiver substantially co-planar with the acoustic source that responds to the acoustic signal, and provides signaling containing information about the acoustic signal injected into the mixture of concrete, which is further processed to determine the air content of the mixture of concrete. The AIRtrac™ sensor does not sensor or measure real time moisture or water content in the wet cement.

Moisture level, and in particular water cement ratio, is a critical parameter that affects the quality of concrete. Excess water in concrete will result in higher porosity, lower strength, and lower durability. Low water cement ratio can also be detrimental to the final concrete strength and can cause difficulty placing and properly consolidating the concrete. If the water to cement ratio is kept below a certain value, the strength of the concrete can be guaranteed to meet specification.

Because of this, there is a need in the industry for measuring and monitoring real time water content in a batch of cement in a ready-mix concrete truck.

SUMMARY OF THE INVENTION

In summary, the present invention provides a new technique for using real time measurement of physical and electrical properties to determine the moisture content of concrete on a ready-mix concrete truck. The innovation of the present invention is the application of real time moisture measurements to a mobile ready-mix concrete truck. The moisture content when combined with the batch weight of cement can be used to calculate the water-cement ratio. Even without knowing the batch weight of cement, just monitoring the moisture content of fresh concrete on a ready-mix truck is advantageous because it allows a remote quality control person to know if and when water is added to the load.

Electrical impedance measurements of a medium are currently used to measure water content in various field including soil analysis, mining, and concrete plants. Frequency/Time domain reflectometry, complex impedance, and conductivity measurements have all been shown to be an accurate indication of water content in fresh and hydrating concrete with various technical tradeoffs.

Electrical conductivity and complex electrical impedance as a function of frequency can be used to determine the water content of fresh concrete. The present invention extends that measurement specifically to be used on a ready mix concrete truck to monitor the water content of fresh concrete from the moment of batching all the way to the job site pour.

The present invention provides for electrical impedance measurement that can be adapted into a hardened sensor element such as the assignee's Smarthatch™ so that moisture level in fresh concrete is monitored continuously from the time concrete is first loaded into the drum at the batch plant until it is finally discharged at the job site. The novelty of the idea is that with the present invention the concrete producer would have the ability to know when water was added. The concrete producer would also be able to calculate how much water was added. Ultimately, the water/cement ratio could be calculated using the measured moisture level, and the total weight of cementitious material determined from the batching system.

Previously, the water/cement ratio has been calculated using a tracking system, that solely relies on the amount of water and cementitious material added initially to the concrete at the batch plant, and any subsequent water added to the truck before the final pour. This calculation has a number of error sources which include the amount of moisture absorbed by the aggregate as well as any evaporation that has occurred before the concrete was poured. True water/cement ratio is the ratio of the free water and the amount of cementitious material, as this most accurately describes the glue that holds concrete together and exhibits the properties described earlier. The only accurate way to know the true water content is a direct real-time measurement as the amount of water absorbed by aggregate and the evaporative amount can vary widely from a number of factors. The techniques described herein will not be subject to these errors due to the direct moisture measurement technique.

Hot days—combination of outside temperature and the increased temperature due to the chemical reaction within the concrete.

Temperature can be used to monitor changes in the water content. Water that's added to a batch of concrete is rarely at the same temperature as the concrete itself. Monitor average temperature of concrete, when water is added the concrete temperature changes rapidly (different from the slow increase in temperature cause by the hydration process). If the amount of concrete and the temperature of the water added is known, then the amount of water added can be determined by the heat capacity and thermal mass of the concrete.

Moisture is measured at multiple points during the rotation of the drum. By knowing the orientation of the drum simultaneously with the moisture measurement measurements while the moisture sensor is out of the concrete can be ignored, and the multiple measurements while the sensor is in the concrete can be averaged to form a more accurate determination of the entire load. Multiple averages over multiple rotations can be combined to further refine the moisture measurement.

A further benefit is that the variability of individual measurements for each rotation and aggregated over multiple rotation can be used to determine the homogeneity of the mix.

The real time moisture measurement over time from the batch plant to the job site can be used in several ways. The initial reading of moisture shortly after loading the truck can be used to validate the batching system expected water content. This initial reading of moisture content along with information about the amount of cement batched sets a starting point to monitor the water cement ratio in real time. The moisture reading and the entrance angle can be used before batching to measure the amount of water left in the drum—this can be used to pre-adjust the water add during batching. After the initial reading, the real-time moisture measurement is an indication of several critical factors. When no additional water is added, the state of hydration is monitored. The slow downward trend of the moisture indicates that hydration is taking place and the concrete is aging. An upward spike in the real-time water content measurement is an indication that water has been added to the mix. This could be from the onboard water tanks on the truck but could also be from another unknown source such as the job site. Integration of the water content over time can be used to quantify the amount of water added.

The present invention utilizes the use of a real-time impedance measurement to determine the moisture content and calculation of cement/water ratio in ready-mix concrete as this currently represents the most practical approach for this measurement. However, various other methods could be used as a substitute for the real-time moisture measurement including nuclear high energy particle a Specific Embodiment In its broadest sense, the present invention provides new and unique apparatus for real time water content and water cement monitoring on a ready-mix concrete truck, which may include, or take the form of:

at least one real time moisture measurement module or sensor configured to:
sense continuous real time moisture measurements of a batch of wet cement loaded into a rotating drum of a ready-mix concrete truck; and
provide signaling containing information about the continuous real time moisture measurements sensed.

The apparatus may include one or more of the following features:

The real time moisture measurement module or sensor may be mounted on a hatch door of the rotating container or a wall of the drum, as well as other parts of the rotating container or drum.

The at least one real time moisture measurement module or sensor may be configured as, or forms part of, at least one hardened sensor element arranged in or on the hatch door, or on the wall of the rotating drum, to sense the continuous real time moisture measurements.

The continuous real time moisture measurements may include:
an initial real time moisture measurement of the batch of wet cement loaded into the rotating drum of the ready-mix concrete truck; and
subsequent real time moisture measurements sensed after the initial real time moisture measurement of the batch of wet cement in the rotating drum, including as the ready-mix concrete truck travels from a patch plant to a pour site, or as the ready-mix concrete truck sits at the pour site.

The continuous real time moisture measurements may be measured using a real time impedance measurement technique. Alternatively, the continuous real time moisture measurements may be measured using a real time nuclear high energy particle absorption measurement technique or a near infrared optical reflectance measurement technique.

The apparatus may include a real time moisture measurement control module configured to receive the signaling sensed from the at least one real time moisture measurement module or sensor and further processing the signaling received.

The real time moisture measurement control module may be arranged in some part of the ready-mix truck, including its cab, or at a remote site for operating by a remote quality control person.

The real time moisture measurement control module may include a transceiver configured to provide the signaling from the ready-mix truck to the remote site for still further processing, e.g., by the remote quality control person. The signaling may also be sent via the Internet, e.g., using a WIFI network.

The real time moisture measurement control module may be configured to determine if and when water was added to the batch of wet cement in the rotating drum, e.g., based upon the continuous real time moisture measurements received.

The real time moisture measurement control module may be configured to determine an amount of water added to the batch of wet cement in the rotating drum, e.g., based upon the continuous real time moisture measurements received.

The real time moisture measurement control module may be configured to receive associated signaling containing information about a known total weight of cementitious material of the batch of wet cement in the rotating drum; and determine a water/cement ratio using a real time moisture level measurement and the known total weight of cementitious material of the batch of wet cement in the rotating drum, e.g., based upon the continuous real time moisture measurements received.

The real time moisture measurement control module may be configured to determine and monitor changes in the real time water content of the batch of wet cement using a temperature-based technique.

The real time moisture measurement control module may be configured to receive associated signaling containing information about a known amount of cement added and a known temperature of the water added and determine a heat capacity and a thermal mass of the batch of wet cement using the temperature-based technique based upon the associated signaling received.

The real time moisture measurement module or sensor may include a temperature sensor configured to determine the temperature of the batch of wet cement in the rotating drum.

The at least one real time moisture measurement module or sensor may include multiple real time moisture measurement modules arranged at multiple points in the rotating drum; and each of the real time moisture measurement modules may be configured to sense corresponding continuous real time moisture measurements of the batch of wet cement at the multiple points of the ready-mix concrete truck; and provide corresponding signaling containing information about the corresponding continuous real time moisture measurements sensed.

The real time moisture measurement control module may be configured to average the corresponding continuous real time moisture measurements determined of the batch of wet cement at the multiple points in the rotating drum.

The real time moisture measurement control module may be configured to average the corresponding continuous real time moisture measurements determined at the multiple points over multiple rotations of the rotating drum, and provide an averaged corresponding continuous real time moisture measurement for further processing.

The real time moisture measurement control module may be configured to determine a homogeneity of the batch of wet cement based upon the averaged corresponding continuous real time moisture measurement.

The continuous real time measurements may include an initial real time moisture measurement sensed after loading the batch of wet cement into the rotating drum of the ready-mix concrete truck; and the real time moisture measurement control module may be configured to receive associated signaling containing information about an expected water content of after the batch of wet cement is loaded into the rotating drum of the ready-mix concrete truck, and validate the expected water content based upon a comparison of the expected water content received and the initial real time moisture measurement.

The real time moisture measurement control module may be configured to receive associated signaling containing information about additional water added to the batch of cement loaded into the rotating drum and monitor a state of hydration of the batch of cement based upon the associated signaling received.

The associated signaling may contain information about no additional water being added to the batch of cement loaded into the rotating drum; and the real time moisture measurement control module may be configured to receive the continuous real time moisture measurements and determine a downward trend of real moisture content of the batch of cement, e.g., based upon the continuous real time moisture measurements received.

The real time moisture measurement control module may be configured to receive the continuous real time moisture measurements and determine an upward spike of real moisture content of the batch of cement, which indicates that water has been added to the batch of cement, e.g., based upon the continuous real time moisture measurements received.

According to some embodiments, the apparatus may include, or take the form of, the hatch door of the rotating drum of the ready-mix concrete truck.

According to some embodiments, the apparatus may include, or take the form of, the rotating drum of the ready-mix concrete truck.

According to some embodiments, the apparatus may include, or take the form of, the ready-mix concrete truck.

The Method

According to some embodiments, the present invention may take the form of a method for real time water content and water cement monitoring on a ready-mix concrete truck, featuring:

sensing with at least one real time moisture measurement module or sensor continuous real time moisture measurements of a batch of wet cement loaded into a rotating drum of a ready-mix concrete truck; and providing with the at least one real time moisture measurement module or sensor signaling containing information about the continuous real time moisture measurements sensed.

The method may also include one or more of the features set forth above and herein.

BRIEF DESCRIPTION OF THE DRAWING

The drawing includes FIGS. 1-4, which are not necessarily drawn to scale, as follows:

FIG. 1 is a block diagram of apparatus having a sensor and a signal processor or signal processing module for implementing the present invention.

FIG. 2 shows a ready-mix truck with an arrow pointing to a hatch door indicating a potential location of a real time moisture measurement module or sensor (RTMMM/S) installation.

FIG. 3 shows a hatch door with a real time moisture measurement module or sensor (RTMMM/S) installed.

FIG. 4 shows the mounting of a real time moisture measurement module or sensor (RTMMM/S) on an interior surface of a mixing drum wall.

DETAILED DESCRIPTION OF BEST MODE OF THE INVENTION

FIG. 1: The Apparatus 10

FIG. 1 shows apparatus 10 for real time water content and water cement monitoring on a ready-mix concrete truck (FIG. 2) that may include at least one real time moisture measurement module or sensor 20, as well as a real time moisture measurement control module 30.

The Real Time Moisture Measurement Module or Sensor 20

By way of example, the real time moisture measurement module or sensor 20 may form part of the rotating drum of the ready-mix concrete truck that is loaded with the batch of wet cement having an amount of water and cementitious material, e.g., consistent with that shown in FIGS. 2-4. For example, the real time moisture measurement module or sensor 20 may be arranged in or on a hatch door (FIG. 3) of the rotating drum, arranged on the drum wall inside the rotating drum, as well as mounted in or on other parts of the rotating container or drum, or some combination thereof. The real time moisture measurement module or sensor 20 may be configured as, or forms part of, at least one hardened sensor element arranged in or on the hatch door or on the rotating drum to sense the continuous real time moisture measurements, e.g., consistent with that shown in FIG. 4.

For example, the real time moisture measurement module or sensor 20 may be configured to:
sense continuous real time moisture measurements of a batch of wet cement loaded into a rotating drum of a ready-mix concrete truck, e.g., as shown in FIGS. 2-4; and
provide signaling containing information about the continuous real time moisture measurements sensed, e.g., consistent with that disclosed herein.

In particular, and by way of example, the continuous real time moisture measurements may include:
an initial real time moisture measurement of the batch of wet cement loaded into the rotating drum of the ready-mix concrete truck; and
subsequent real time moisture measurements sensed after the initial real time moisture measurement of the batch of wet cement in the rotating drum, including where the subsequent real time moisture measurements are sensed as the ready-mix concrete truck travels from a patch plant to a pour site, or as the ready-mix concrete truck sits at the pour site.

The real time moisture measurement module or sensor 20 may include a signal processor or signal processing module 20a configured to process and provide the signaling sensed accordingly, e.g., including providing the signaling sensed to the real time moisture measurement control module 30.

The Real Time Moisture Measurement Control Module 30

By way of example, the real time moisture measurement control module 30 may be configured to receive the signaling from the real time moisture measurement module or sensor 20 and further process the signaling received. The real time moisture measurement control module 30 may be arranged or configured in the ready-mix truck, including in its cab, or at a remote site. The scope of the invention is not intended to be limited to where the real time moisture measurement control module 30 is arranged or configured in relation to the ready-mix truck or the remote site.

The real time moisture measurement control module 30 may include a transceiver 32, e.g., configured to provide the signaling from the cab of the ready-mix truck to the remote site for still further processing. In effect, the real time moisture measurement control module 30 may be configured to process the signaling consistent with that disclosed herein, in the cab of the ready-mix truck at the remote site. The scope of the invention is not intended to be limited to where the real time moisture measurement control module 30 is located. Moreover, the transceiver 32 may receive control signal from the remote site containing information to control the real time moisture measurement module or sensor 20, the real time moisture measurement control module 30, or both.

The Continuous Real Time Moisture Measurements

By way of example, the continuous real time moisture measurements may be measured using a real time impedance measurement technique. Alternatively, the continuous real time moisture measurements may be measured using a real time nuclear high energy particle absorption measurement technique or a near infrared optical reflectance measurement technique. Techniques for implementing real time impedance measurements, real time nuclear high energy particle absorption measurements, or near infrared optical reflectance measurements are known in the art, and the scope of the invention is not intended to be limited to any particular type or kind thereof either now known or later developed in the future.

The Signal Processing of the Real Time Moisture Measurements

The signaling sensed containing information about the real time moisture measurements may be further processed, as follows:

By way of example, the signaling sensed may be processed to determine if and when water was added to the batch of wet cement in the rotating drum based upon the continuous real time moisture measurements received. For example, two continuous real time moisture measurements may be compared, and if a subsequent continuous real time moisture measurement is greater than a prior continuous real time moisture measurement, then the real time water content of the batch of cement increased, so water was added.

The signaling sensed may be processed to determine an amount of water added to the batch of wet cement in the rotating drum. For example, the real time moisture measurement control module 30 may be configured to receive associated signaling containing information about a known total weight of cementitious material of the batch of wet cement in the rotating drum; and determine a water/cement ratio using a real time moisture level measurement and the known total weight of cementitious material of the batch of wet cement in the rotating drum.

The signaling sensed may be processed to determine and monitor changes in the real time water content of the batch of wet cement using a temperature-based technique. For example, the real time moisture measurement control module 30 may be configured to receive associated signaling containing information about a known amount of cement added and a known temperature of the water added and determine a heat capacity and a thermal mass of the batch of wet cement using the temperature-based technique based upon the associated signaling received. The real time moisture measurement module or sensor 20 may include a temperature sensor 22 configured to determine the temperature of the batch of wet cement in the rotating drum.

By way of example, the continuous real time measurements may include an initial real time moisture measurement sensed after loading the batch of wet cement into the rotating drum of the ready-mix concrete truck; and the real time moisture measurement control module 30 may be configured to receive associated signaling containing information about an expected water content of after the batch of wet cement is loaded into the rotating drum of the ready-mix concrete truck, and validate the expected water content based upon a comparison of the expected water content received and the initial real time moisture measurement.

The real time moisture measurement control module 30 may be configured to receive associated signaling containing information about additional water added to the batch of cement loaded into the rotating drum and monitor a state of hydration of the batch of cement based upon the associated signaling received. By way of example, the associated signaling may contain information about no additional water being added to the batch of cement loaded into the rotating drum; and the real time moisture measurement control module 30 may be configured to receive the continuous real time moisture measurements and determine a downward trend of real moisture content of the batch of cement based upon the continuous real time moisture measurements received.

In contrast, the real time moisture measurement control module 30 may be configured to receive the continuous real time moisture measurements and determine an upward spike of real time moisture content of the batch of cement, which indicates that water has been added to the batch of cement, based upon the continuous real time moisture measurements received.

Multiple Real Time Moisture Measurement Modules Arranged at Multiple Points in the Rotating Drum The real time moisture measurement module or sensor 20 may include, or take the form of, multiple real time moisture measurement modules 20 arranged at multiple points in the rotating drum; and each of the real time moisture measurement modules may be configured to
- sensed corresponding continuous real time moisture measurements of the batch of wet cement at the multiple points of the ready-mix concrete truck; and
- provide corresponding signaling containing information about the corresponding continuous real time moisture measurements sensed.

By way of example, the real time moisture measurement control module 30 may be configured to average the corresponding continuous real time moisture measurements determined of the batch of wet cement at the multiple points in the rotating drum, which provides a more consistent indication of the real time water content of the batch of cement. In particular, the real time moisture measurement control module 30 may be configured to average the corresponding continuous real time moisture measurements determined at the multiple points over multiple rotations of the rotating drum, and provide an averaged corresponding continuous real time moisture measurement for further processing. The real time moisture measurement control module 30 may also be configured to determine a homogeneity of the batch of wet cement based upon the averaged corresponding continuous real time moisture measurement.

The Signal Processor or Processing Modules 20a, 30a

The functionality of the signal processor or processor control modules 20a, 30a may be implemented using hardware, software, firmware, or a combination thereof. In a typical software implementation, the processor module may include one or more microprocessor-based architectures having a microprocessor, a random access memory (RAM), a read only memory (ROM), input/output devices and control, data and address buses connecting the same, e.g., consistent with that shown in FIG. 1, as well as other signal processor circuits or components 20b, 30b.

A person skilled in the art would be able to program such a microprocessor-based architecture(s) to perform and implement such signal processing functionality described herein without undue experimentation. The scope of the invention is not intended to be limited to any particular implementation using any such microprocessor-based architecture or technology either now known or later developed in the future.

The Associated Signaling

Consistent with that disclosed herein, and by way of example, the associated signaling may be received, e.g., from the remote site and stored in a memory forming part of other signal processor circuits or components 20b. The scope of the invention is not intended to be limited to how the associated signaling is provided to, or received by, e.g., the real time moisture measurement control module 30.

The Rotating Container or Drum

By way of example, the present invention is disclosed based upon using a rotating drum forming part of a concrete mixing truck. However, the scope of the invention is not intended to be limited to the same. For example, embodiments are envisioned, and the scope of the invention is intended to include, e.g., using other types or kinds of rotating containers or drums either now known or later developed in the future that may be configured to receive and contain concrete, as well as rotate and mix the concrete.

The Concrete

By way of example, the present invention is disclosed based upon mixing a slurry, e.g., such as concrete, using a rotating drum. However, the scope of the invention is not intended to be limited to the same. For example, embodiments are envisioned, and the scope of the invention is intended to include, e.g., processing other types or kinds of slurries either now known or later developed in the future, including other types or kinds of slurries that are sensitive to the amount of water contained therein, other types or kinds of or slurries that are mixed and poured from a rotating container or drum.

Means for Attaching

Means for attaching a sensor inside a rotating container or drum is known in the art, and the scope of the invention is not intended to be limited to any particular types or kinds thereof either now known or later developed in the future. By way of example, the sensor may include a sensor housing that may be fastened inside the rotating container or drum using fasteners like screws.

Signal Exchange Between the Real Time Moisture Module 20 and the Real Time Moisture Control Module 30

The real time moisture measurement module 20 may be configured to provide the signaling to the real time moisture measurement control module 30 via a hardwire connection or via a wireless connection, which are both known in the art.

Techniques for connecting a component arranged on a rotating device are known in the art, and the scope of the invention is not intended to be limited to any type or kind of such a hardwire connection either now known or later developed in the future.

Moreover, techniques for connecting two components via a wireless connection are also known in the art, and the scope of the invention is not intended to be limited to any type or kind of such a hardwire connection either now known or later developed in the future.

The Scope of the Invention

While the invention has been described with reference to an exemplary embodiment, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is not intended that the invention be limited to the particular embodiment(s) disclosed herein as the best mode contemplated for carrying out this invention.

What is claimed is:

1. Apparatus for real time water content and water cement monitoring on a ready-mix concrete truck, comprising:
    at least one real time moisture measurement module configured to
        sense continuous real time moisture measurements of a batch of wet cement loaded into a rotating drum of a ready-mix concrete truck; and
        provide signaling containing information about the continuous real time moisture measurements sensed; and
    a real time moisture measurement control module having a transceiver, and being arranged in a cab of the ready-mix truck and configured to receive the signaling from the at least one real time moisture measurement module, and further process the signalling received, the transceiver configured to provide the signaling from the cab to a remote site for still further processing.

2. The apparatus according to claim 1, wherein the continuous real time moisture measurements are measured using a real time impedance measurement technique.

3. The apparatus according to claim 1, wherein the continuous real time moisture measurements are measured using a real time nuclear high energy particle absorption measurement technique or a near infrared optical reflectance measurement technique.

4. The apparatus according to claim 1, wherein the at least one real time moisture measurement module or sensor forms part of the rotating drum of the ready-mix concrete truck that is loaded with the batch of wet cement having an amount of water and cementitious material.

5. The apparatus according to claim 1, wherein the at least one real time moisture measurement module or sensor is configured as, or forms part of, at least one hardened sensor element arranged in the rotating drum to determine the continuous real time moisture measurements.

6. The apparatus according to claim 1, wherein the real time moisture measurements include:
    an initial real time moisture measurement of the batch of wet cement loaded into the rotating drum of the ready-mix concrete truck; and
    subsequent real time moisture measurements after the initial real time moisture measurement of the batch of wet cement in the rotating drum, including as the ready-mix concrete truck travels from a patch plant to a pour site, or as the ready-mix concrete truck sits at the pour site.

7. The apparatus according to claim 1, wherein the real time moisture measurement control module is configured to determine if and when water was added to the batch of wet cement in the rotating drum based upon the continuous real time moisture measurements.

8. The apparatus according to claim 1, wherein the real time moisture measurement control module is configured to determine an amount of water added to the batch of wet cement in the rotating drum.

9. The apparatus according to claim 1, wherein the real time moisture measurement control module is configured to receive associated signaling containing information about a known total weight of cementitious material of the batch of wet cement in the rotating drum; and determine a water/cement ratio using a real time moisture level measurement and the known total weight of cementitious material of the batch of wet cement in the rotating drum.

10. The apparatus according to claim 1, wherein the real time moisture measurement control module is configured to determine and monitor changes in the real time water content of the batch of wet cement using a temperature-based technique.

11. The apparatus according to claim 10, wherein the real time moisture measurement module includes a temperature sensor configured to determine the temperature of the batch of wet cement in the rotating drum.

12. The apparatus according to claim 1, wherein
    the at least one real time moisture measurement module comprises real time moisture measurement modules arranged at multiple points in the rotating drum; and
    each of the real time moisture measurement modules is configured to
        sense corresponding continuous real time moisture measurements of the batch of wet cement at the multiple points of the ready-mix concrete truck; and
        provide corresponding signaling containing information about the corresponding continuous real time moisture measurements sensed.

13. The apparatus according to claim 1, wherein
    the continuous real time measurements includes an initial real time moisture measurement sensed after loading the batch of wet cement into the rotating drum of the ready-mix concrete truck; and
    the real time moisture measurement control module is configured to receive associated signaling containing information about an expected water content after the batch of wet cement is loaded into the rotating drum of the ready-mix concrete truck, and validate the expected water content based upon a comparison of the expected water content received and the initial real time moisture measurement.

14. The apparatus according to claim 1, wherein the real time moisture measurement control module is configured to receive associated signaling containing information about additional water added to the batch of cement loaded into the rotating drum and monitor a state of hydration of the batch of cement based upon the associated signaling received.

15. The apparatus according to claim 14, wherein
    the associated signaling contains information about no additional water being added to the batch of cement loaded into the rotating drum; and
    the real time moisture measurement control module is configured to receive the continuous real time moisture measurements and determine a downward trend of real moisture content of the batch of cement based upon the continuous real time moisture measurements received.

16. The apparatus according to claim 14, wherein the real time moisture measurement control module is configured to receive the continuous real time moisture measurements and determine an upward spike of real moisture content of the batch of cement, which indicates that water has been added to the batch of cement, based upon the continuous real time moisture measurements received.

17. The apparatus according to claim 1, wherein the apparatus comprises a hatch door of the rotating drum of the ready-mix concrete truck.

18. The apparatus according to claim 1, wherein the apparatus comprises the rotating drum of the ready-mix concrete truck.

19. The apparatus according to claim 1, wherein the apparatus comprises the ready-mix concrete truck.

20. An apparatus for real time water content and water cement monitoring on a ready-mix concrete truck, comprising:
   at least one real time moisture measurement module configured to
      sense continuous real time moisture measurements of a batch of wet cement loaded into a rotating drum of a ready-mix concrete truck; and
      provide signaling containing information about the continuous real time moisture measurements sensed; and
   a real time moisture measurement control module configured to
      receive the signaling from the at least one real time moisture measurement module, and
      further process the signaling received to determine and monitor changes in the real time water content of the batch of wet cement using a temperature-based technique, and
   the real time moisture measurement control module is configured to receive associated signaling containing information about a known amount of cement added and a known temperature of the water added and determine a heat capacity and a thermal mass of the batch of wet cement using the temperature-based technique based upon the associated signaling received.

21. An apparatus for real time water content and water cement monitoring on a ready-mix concrete truck, comprising:
   at least one real time moisture measurement module configured to
      sense continuous real time moisture measurements of a batch of wet cement loaded into a rotating drum of a ready-mix concrete truck; and
      provide signaling containing information about the continuous real time moisture measurements sensed, and
   the at least one real time moisture measurement module having real time moisture measurement modules arranged at multiple points in the rotating drum, and
   each of the real time moisture measurement modules configured to
      sensed corresponding continuous real time moisture measurements of the batch of wet cement at the multiple points of the ready-mix concrete truck, and
      provide corresponding signaling containing information about the corresponding continuous real time moisture measurements sensed, and
   a real time moisture measurement control module configured to
      receive the signaling from the at least one real time moisture measurement module, and
      further process the signaling received to average the corresponding continuous real time moisture measurements determined of the batch of wet cement at the multiple points in the rotating drum.

22. The apparatus according to claim 21, wherein the real time moisture measurement control module is configured to average the corresponding continuous real time moisture measurements determined at the multiple points over multiple rotations of the rotating drum, and provide an averaged corresponding continuous real time moisture measurement for further processing.

23. The apparatus according to claim 22, wherein the real time moisture measurement control module is configured to determine a homogeneity of the batch of wet cement based upon the averaged corresponding continuous real time moisture measurement.

24. A method for real time water content and water cement monitoring on a ready-mix concrete truck, comprising:
   sensing with at least one real time moisture measurement module continuous real time moisture measurements of a batch of wet cement loaded into a rotating drum of a ready-mix concrete truck; and
   providing with the at least one real time moisture measurement module signaling containing information about the continuous real time moisture measurements sensed;
   receiving with a real time moisture measurement control module the signaling from the at least one real time moisture measurement module and further processing the signaling received;
   arranging the real time moisture measurement control module in the ready-mix truck; and
   provide the real time moisture measurement control module with a transceiver to send the signaling from the ready-mix truck to a remote site for still further processing.

25. The method according to claim 23, wherein the method comprises measuring the continuous real time moisture measurements using a real time impedance measurement technique.

26. The method according to claim 24, wherein the method comprises measuring the continuous real time moisture measurements using a real time nuclear high energy particle absorption measurement technique or a near infrared optical reflectance measurement technique.

27. The method according to claim 24, wherein the method comprises forming the at least one real time moisture measurement module as part of the rotating drum of the ready-mix concrete truck that is loaded with the batch of wet cement having an amount of water and cementitious material.

28. The method according to claim 24, wherein the method comprises configuring the at least one real time moisture measurement module as part of at least one hardened sensor element arranged in the rotating drum to determine the continuous real time moisture measurements.

29. The method according to claim 24, wherein the continuous real time moisture measurements include:
   an initial real time moisture measurement of the batch of wet cement loaded into the rotating drum of the ready-mix concrete truck; and subsequent real time moisture measurements sensed after the initial real time moisture measurement of the batch of wet cement in the rotating drum, including as the ready-mix concrete truck travels from a patch plant to a pour site, or as the ready-mix concrete truck sits at the pour site.

30. The method according to claim 24, wherein the method comprises determining with the real time moisture measurement control module if and when water was added to the batch of wet cement in the rotating drum based upon the continuous real time moisture measurements.

31. The method according to claim 24, wherein the method comprises determining with the real time moisture measurement control module an amount of water added to the batch of wet cement in the rotating drum.

32. The method according to claim 24, wherein the method comprises receiving with the real time moisture measurement control module associated signaling containing information about a known total weight of cementitious material of the batch of wet cement in the rotating drum; and determining a water/cement ratio using a real time moisture level measurement and the known total weight of cementitious material of the batch of wet cement in the rotating drum.

33. The method according to claim 24, wherein the method comprises determining and monitoring with the real time moisture measurement control module changes in the real time water content of the batch of wet cement using a temperature-based technique.

34. The method according to claim 24, wherein the method comprises
configuring the at least one real time moisture measurement module with real time moisture measurement modules arranged at multiple points in the rotating drum; and
configuring each of the real time moisture measurement modules to
sense corresponding continuous real time moisture measurements of the batch of wet cement at the multiple points of the ready-mix concrete truck; and
provide corresponding signaling containing information about the corresponding continuous real time moisture measurements sensed.

35. The method according to claim 24, wherein the method comprises
including in the continuous real time measurements an initial real time moisture measurement sensed after loading the batch of wet cement into the rotating drum of the ready-mix concrete truck; and
receiving with the real time moisture measurement control module associated signaling containing information about an expected water content after the batch of wet cement is loaded into the rotating drum of the ready-mix concrete truck, and validating the expected water content based upon a comparison of the expected water content received and the initial real time moisture measurement.

36. The method according to claim 24, wherein the method comprises receiving with the real time moisture measurement control module associated signaling containing information about additional water added to the batch of cement loaded into the rotating drum and monitoring with the real time moisture measurement control module a state of hydration of the batch of cement based upon the associated signaling received.

37. The method according to claim 36, wherein
the associated signaling contains information about no additional water being added to the batch of cement loaded into the rotating drum; and
the method comprises receiving with the real time moisture measurement control module the continuous real time moisture measurements and determining a downward trend of real moisture content of the batch of cement based upon the continuous real time moisture measurements received.

38. The method according to claim 36, wherein the method comprises receiving with the real time moisture measurement control module the continuous real time moisture measurements and determining an upward spike of real moisture content of the batch of cement, which indicates that water has been added to the batch of cement, based upon the continuous real time moisture measurements received.

39. A method comprising:
sensing with at least one real time moisture measurement module continuous real time moisture measurements of a batch of wet cement loaded into a rotating drum of a ready-mix concrete truck;
providing with the at least one real time moisture measurement module signaling containing information about the continuous real time moisture measurements sensed;
receiving with a real time moisture measurement control module and further processing the signaling received to determine and monitor with the real time moisture measurement control module changes in the real time water content of the batch of wet cerement using a temperature-based technique; and
receiving with the real time moisture measurement control module associated signaling containing information about a known amount of cement added and a known temperature of the water added and determining with the real time moisture measurement control module a heat capacity and a thermal mass of the batch of wet cement using the temperature-based technique based upon the associated signaling received.

40. The method according to claim 33, wherein the method comprises configuring the real time moisture measurement module with a temperature sensor to determine the temperature of the batch of wet cement in the rotating drum.

41. A method comprising:
sensing with at least one real time moisture measurement module continuous real time moisture measurements of a batch of wet cement loaded into a rotating drum of a ready-mix concrete truck;
providing with the at least one real time moisture measurement module signaling containing information about the continuous real time moisture measurements sensed;
receiving with a real time moisture measurement control module and signaling from the at least one real time moisture measurement module and further processing the signaling received
configuring the at least one real time moisture measurement module with real time moisture measurement modules arranged at multiple points in the rotating drum; and
sense corresponding continuous real time moisture measurements of the batch of wet cement at the multiple points of the ready-mix concrete truck; and
provide corresponding signaling containing information about the corresponding continuous real time moisture measurements sensed; and averaging with the real time moisture measurement control module the corresponding continuous real time moisture measurements determined of the batch of wet cement at the multiple points in the rotating drum.

42. The method according to claim 41, wherein the method comprises averaging with the real time moisture measurement control module the corresponding continuous real time moisture measurements determined at the multiple points over multiple rotations of the rotating drum, and providing an averaged corresponding continuous real time moisture measurement for further processing.

43. The method according to claim 42, wherein the method comprises determining with the real time moisture measurement control module a homogeneity of the batch of wet cement based upon based upon the averaged corresponding continuous real time moisture measurement.

* * * * *